United States Patent
Sugawara et al.

(10) Patent No.: US 6,411,631 B1
(45) Date of Patent: *Jun. 25, 2002

(54) MULTIPLEX TYPE TRANSMITTING APPARATUS

(75) Inventors: Toshiki Sugawara, Dallas; Yukio Nakano, Richardson, both of TX (US); Masaki Ohira; Takashi Mori, both of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,294

(22) Filed: Apr. 4, 2000

Related U.S. Application Data

(63) Continuation of application No. 08/882,727, filed on Jun. 26, 1997, now Pat. No. 6,094,440.

(30) Foreign Application Priority Data

Jul. 5, 1996 (JP) ............................................. 8-176088

(51) Int. Cl.⁷ ................................................. H04J 3/16
(52) U.S. Cl. ....................... 370/465; 370/522; 370/538
(58) Field of Search ................................ 370/465, 522, 370/538, 907, 466, 524, 539, 242, 243, 244, 248, 503

(56) References Cited

U.S. PATENT DOCUMENTS

| | | | |
|---|---|---|---|
| 5,526,349 A | 6/1996 | Diaz et al. | 370/466 |
| 5,535,219 A | 7/1996 | Freitas | 370/522 |
| 5,568,486 A | 10/1996 | Uuscroft et al. | 370/465 |
| 5,623,357 A | 4/1997 | Kight et al. | 370/907 |
| 5,857,092 A | * 1/1999 | Nakamura et al. | 370/466 |
| 6,094,440 A | * 7/2000 | Sugawara et al. | 370/465 |
| 6,118,795 A | * 9/2000 | Fukunaga et al. | 370/503 |

* cited by examiner

*Primary Examiner*—Huy D. Vu
*Assistant Examiner*—Phuongchau Ba Nguyen
(74) *Attorney, Agent, or Firm*—Antonelli, Terry, Stout & Kraus, LLP

(57) ABSTRACT

A multiplex type transmitting apparatus is arranged to have a plurality of slow signal receive/transmit sections for accommodating a counterpart for a SONET system or an SDH system, a multiplex separation converting section, and a receive/transmit section for a SONET system or SDH system fast signal. The slow or fast signal receive/transmit section includes a receive processing unit on a receive side for receiving the SS bits of the SONET/SDH system signal received from a transmission path, an internal SS bits setting unit for setting the SS bits of the received signal to internal SS bits if the SS bits of the received signal are "10" or "00", a transmit processing unit on the receive side for transmitting a signal to the multiplex separation converting section as keeping the SS bits as "11" when an AIS-P is transferred, and a transmit processing unit on a transmit side for transmitting the signal from the multiplex separation converting section onto the transmission path as keeping the SS bits identical with the internal SS bits.

2 Claims, 10 Drawing Sheets

FIG.1

| Overhead | | Function |
|---|---|---|
| Section Overhead (Regenerator Section Overhead) | A1,A2 | Framing |
| | B1 | Error monitoring |
| | D1~D3 | Data communication |
| | E1 | Voice communication |
| | J0/Z0 formerly, C1 | J0: Section Trace (R-Section Trace) Z0: Reserved for future growth C1: Fixed pattern     SONET : STS-1 ID     SDH    : STM identifier |
| | F1 | Channel for network provider |
| Line Overhead (Administrative Unit Pointer) | H1, H2 | Indicating the first byte of the STS Synchronous Payload Envelope (Virtual Container) |
| | H3 | Used for frequency justification |
| Line Overhead (Multiplex Section Overhead) | B2 | Error monitoring |
| | M1 | Far-end error monitoring |
| | K1, K2 | Automatic Protection Switching signaling |
| | D4~D12 | Data communication |
| | E2 | Voice communication |
| | S1 | convey the Synchronization Status |
| | Z1, Z2 | Reserved for future growth |

FIG.9

| | RECEIVE SIDE | |
|---|---|---|
| RECEIVE PROCESSING UNIT 11 ON RECEIVE SIDE | TRANSMIT PROCESSING UNIT 12 ON RECEIVE SIDE | TRANSMIT PROCESSING UNIT 22 ON TRANSMIT SIDE |
| DETECT THE "INTERNAL SS BITS" FROM INPUT SS BITS. THE "INTERNAL SS BITS" ARE ANY ONE OF "10" OR "00". UNLESS THEY ARE RECEIVED, THE PREVIOUS STATUS IS HELD. | (1) IF AIS IS TRANSFERRES, THE SS BITS ARE MADE TO BE "11". (2) EXCEPT THE CASE, THE SS BITS ARE NOT PROCESSED, SET TO THE "INTERNAL SS BITS" OR ANY VALUE | (1) IF AIS IS TRANSFERRED, THE SS BITS ARE NOT PROCESSED, OR SET TO "11". (2) EXCEPT THE CASE, THE SS BITS ARE SET TO THE "INTERNAL SS BITS". | ns
MULTIPLEX TYPE TRANSMITTING APPARATUS

This is a continuation of application Ser. No. 08/882,727, filed Jun. 26, 1997, now U.S. Pat. No. 6,094,440.

BACKGROUND OF THE INVENTION

The present invention relates to a multiplex type transmitting apparatus which is arranged to hold various kinds of transmission synchronous systems of an SDH (Synchronous Digital Hierarchy) and a SONET (Synchronous Optical Network).

The conventional synchronous digital transmitting systems include a SONET synchronous transmitting system defined on the ANSI T1.105 and an SDH synchronous transmitting system defined on the ITU-TG.707 (1995).

For both of these transmitting systems, a concept of a layer such as a path, a line (M-section), or a section (R-section) and a way of use of an overhead are commonly set to these two transmitting systems.

FIG. 1 is a table showing a comparison of a way of use of each overhead of two kinds of synchronous digital transmitting systems. In the promotion of the overhead in each of the synchronous digital transmitting systems, the differences between the SONET transmitting system and the SDH one is only the following four points. First, the former system uses a C1 byte of a section overhead for specifying an OC-1 multiplex number of an OC-M signal, while the latter system uses the C1 byte of the section overhead for specifying an STM-1 multiplex number of an STM-M signal. The second different point is the way of use of the J0 byte of the section overhead. The third different point is the way of use of the S1 byte of the line overhead. The fourth different point is the way of use of SS bits which correspond to fifth and sixth bits of an H1 byte of a pointer.

The SDH transmitting system gives the C1 byte a multiplex number expressed at an STM-1 basis, while the SONET transmitting system gives the C1 byte a multiplex number expressed at an OC-1 basis. It means that both of the transmitting systems have respective transmission values. However, the SONET transmitting system is regulated to ignore the received C1 byte, while the SDH transmitting system has no regulation about the received C1 byte.

The J0 byte is used as a section trace (R-section trace). The SDH transmitting system has a regulation about the way of use of the J0 byte defined in the ITU-T G.707, while the SONET transmitting system has no regulation thereabout.

The low-order four bits of the S1 byte is used for a Synchronization Status Message indicating a network synchronous state. The code values of the four bits are respective in both of the transmitting systems.

In turn, the description will be oriented to the SS bits of a pointer. The pointers positioned at the H1 and the H2 bytes of the overhead are used each for indicating a head phase of a path. As shown in FIG. 2 which indicates the structure of a pointer portion of the overhead, both of the transmitting systems have respective ways of use for the SS bits of the H1 byte (fifth and sixth bits of the H1 byte). Concretely, the SDH system is defined so that the SS bits indicate an AU type and are defined as "10", while the SONET system is undefined. In the SONET system, the undefined bit is "0", so that the SS bits are made to be "00".

The SONET transmitting system is arranged to ignore the SS bits in interpreting the pointer value, while the SDH transmitting system is arranged to contain the SS bits in the condition of interpreting the pointer value as described in the ITU-T G.783 ANNEX C(1996).

Herein, consider that a certain multiplex type transmitting apparatus is connected to the SDH system transmission path and the SONET system transmission path. For example, the fast transmission path employs the SONET system, while the slow transmission path employs the SDH system. At this time, the disadvantageous factor impacted on a main signal is only the difference of the SS bits among the foregoing four differences. Later, this factor will be discussed concretely. The slow transmission path is a signal transmission path in low bit rate of data before the multiplexing, and while the fast transmission path is a signal transmission path in high bit rate of data after the multiplexing. Hereinafter, the signal in low bit rate and the signal in high bit rate are called "slow signal" and "fast signal", respectively.

Assume that the SONET system multiplexing apparatus provided with a pointer processing section receives the SDH system SS bits ("10"). In this case, the SS bits are ignored, so that the SS bits give no impact on the main signal. On the other hand, assume that the SDH system multiplexing apparatus provided with the pointer processing section containing the SS bits as the interpreting condition of the pointer value receives the SONET system SS bits ("00"). In this case, even if the received data is normal, the pointer processing section operates to detect a lost of pointer (AU-LOP) resulting from a mismatch of the SS bits. If an AU (Administrative Unit) detects an AU-LOP, an alarm signal (AU-AIS) is inserted into the AU. As a result, the received data disappears. Herein, the insertion of the AU-AIS means that the AU pointer and all the bits of a higher-order virtual container are made "1's".

On the other hand, the differences of the J0 (C1) byte and the S1 byte do not have any impact on the main signal, such as disappearance of the received data.

As set forth above, the SONET system has a different way of use of the J0 (C1) byte, the S1 byte, and the SS bits (fifth and sixth bits of the H1 byte) of the H1 byte of the pointer from the SDH system. If, therefore, any one of the SONET and the SDH transmitting systems is connected as a counterpart of the slow signal transmission path or the fast signal transmission path, each time the counterpart is connected, it has been necessary to at least select the SS bits of the SONET system or those of the SDH system to be transmitted by setting the SONET system signal or the SDH system signal from an operation system or a local craft interface. Or, in some cases, it has been necessary to select the J0 (C1) byte and the S1 byte of the SONET system or those bytes of the SDH system in addition to the above-mentioned selection of the SS bits together.

In a case that the multiplex type transmitting apparatuses connected over a border of an international network have difficulty in determining that the counterpart of the slow signal transmission path or the fast signal transmission path is the SONET transmission system or the SDH transmission system, the transmission of the proper SS bits is disallowed to be assured. In some cases, the counterpart of the SDH system may induce the disappearance of data resulting from the mismatch of the received SS bits as mentioned above.

SUMMARY OF THE INVENTION

The present invention is invented in consideration of the aforementioned problems, and it is an object of the present invention to provide a multiplex type transmitting apparatus to be connected to any one of the SONET transmission system and the SDH transmission system counterparts for the slow transmission path or the fast transmission path without having to set the SONET system or the SDH system through the operation system or the local craft interface.

According to an aspect of the present invention, a multiplex type transmitting system includes a plurality of slow signal receive/transmit sections for receiving and transmitting a SONET system signal or an SDH system signal, a multiplex separation converting section, and a fast signal receive/transmit section for receiving and transmitting a SONET system signal or an SDH system signal. Each of the slow signal receive/transmit sections and the fast signal receive/transmit sections includes a receive processing unit on a receive side for receiving the SS bits (fifth and sixth bits of the H1 byte) SONET system or the SDH system signal received from the transmission path, an internal SS bits setting unit for setting the received SS bits to internal SS bits if the received SS bits is "10" or "00" or holding the previous state of the internal SS bits in any other case, a transmit processing unit on the receive side for setting the SS bits to "11" if the AIS is transferred, or unprocessing the SS bits or setting the SS bits to the internal SS bits or any value in any other case and then transmitting the resulting signal to the multiplex separation converting section, and a transmit processing unit on the transmitting side for keeping the SS bits as it is or setting the SS bits to "11" when the AIS is transferred with the signal from the multiplex separation converting section, or setting the SS bits to the internal SS bits in any other case and then transmitting the resulting signal onto the transmission path.

The multiplex type transmitting system according to the present invention is arranged as described above. Thus, though the SONET system has a different way of use of the SS bits of the H1 byte from the SDH system, when the SONET system interface of the apparatus is received with the SDH system signal or vice versa, the interface enables to identify the SONET system signal or the SDH system signal without any indication given from the operation system or the local craft interface and to transmit the proper SS bits to the counterpart.

Herein, the description will be oriented to the use of the multiplex type transmitting system closer to the border of the international network. FIG. 3 shows an overall appearance of (1) connecting the SDH system slow signal and (2) connecting the SDH fast signal to the multiplex type transmitting apparatus on the SONET system close to the border (frontier) between the SONET transmitting system as used in USA and the SDH transmitting system as used in Mexico, for example.

For (1) the connection of the SDH system slow signal, an SDH system multiplex type transmitting apparatus 250 is connected as a counterpart of a slow signal receive/transmit section (OC-12) 1-16 of the SONET system multiplex type transmitting apparatus 100. The SONET system multiplex type transmitting apparatus 150 (LTE: Line Terminating Equipment) is connected as a counterpart of another slow signal receive/transmit section (OC-12) 1.

For (2) the connection of the SDH system fast signal, a SONET system insertion separation multiplex type transmitting apparatus 103 and an SDH system insertion separation multiplex type transmitting apparatus 200 are connected as the counterparts of the fast signal receive/transmit sections (OC-192) 3 and 4 of the SONET system insertion separation multiplex type transmitting apparatuses 101 and 102 (ADM: Add Drop Multiplexer). The slow signal receive/transmit sections (OC-12) 1-3 and 1-4 of the insertion separation multiplex type transmitting apparatus 102 are connected as their counterparts to a SONET system multiplex type transmitting apparatus 150 and an SDH system multiplex type transmitting apparatus 250.

The fast transmission path between two LTEs not shown in FIG. 3 may be over the fast transmission path.

In turn, the LTE and the ADM shown in FIG. 3 will be described with reference to FIGS. 4 and 5. FIG. 4 is a functional block diagram showing an LTE multiplex type transmitting apparatus used for both the SDH system and the SONET system. As shown in FIG. 4, the LTE is composed of plural slow signal receive/transmit sections 1-1, 1-2, . . . , 1-16, a multiplex separating section 2, and a fast signal receive/transmit section 3. The signal receive/transmit section 1 or 3 includes an SPI (SDH Physical Interface) 30, a RST (Regenerator Section Termination) 40, an MST (Multiplex Section Termination) 50, an MSP (Multiplex Section Protection) 60, an MSA (Multiplex Section Adaptation) 70, and a HCS (Higher Order Path Connection Supervisory) 80, each of which have the corresponding function SPT, RST, MST, MSP, MSA, or HCS of the SDH system regulated in the ITU-TG.783 and the corresponding function of the SONET system as well.

FIG. 5 is a function block diagram showing an ADM type multiplex type transmitting apparatus used for both the SDH system and the SONET system. As shown in FIG. 5, the ADM includes a plurality of slow signal receive/transmit sections 1-1, 1-2, . . . , 1-16, a multiplex separating section 2, an insertion separating section 5, and fast signal receive/transmit sections 3 and 4. Like the LTE, each of the signal receive/transmit sections 1, 3, and 4 includes an SPI 30, a RST 40, an MST 50, an MSP 60, an MSA 70, and a HCS 80, each of which have the corresponding function of the SDH system regulated in the ITU-TG.783 and the corresponding function of the SONET system as well.

Next, the description will be oriented to the signal receive/transmit section of the LTE described in FIG. 4 and the ADM described in FIG. 5 with reference to FIG. 6. A signal transmitted from the transmission path side is applied to a pointer interpreting unit 111 of the MSA 70 in which the signal is interpreted as the pointer information and the information from an operating system 9. If necessary, the signal is converted in a pointer converting unit 112. The signal transmitted from the multiplex separation converting section 2 or the insertion separating section 5 is determined in an SS bits insertion determining unit 222 in which the information of an AIS identifying unit 211 of the MSA and the information from the operating system 9 are determined from the signal. An SS bits inserting unit 221 operates to insert the SS bits and then send out the resulting signal on the transmission path.

BRIEF DESCRIPTION OF THE DRAWINGS

Preferred embodiments of the present invention will now be described in conjunction with the accompanying drawings, in which;

FIG. 1 is a table for comparison of the way of use of an overhead between two kinds of synchronous digital transmitting systems;

FIG. 9 is an explanatory view showing processing contents of a receive processing section on a receive side, a transmit processing section on a receive side, and a transmit processing section on a transmit side of a multiplex type transmitting apparatus according to an embodiment of the present invention;

DESCRIPTION OF THE PREFERRED EMBODIMENTS

Figure 2:
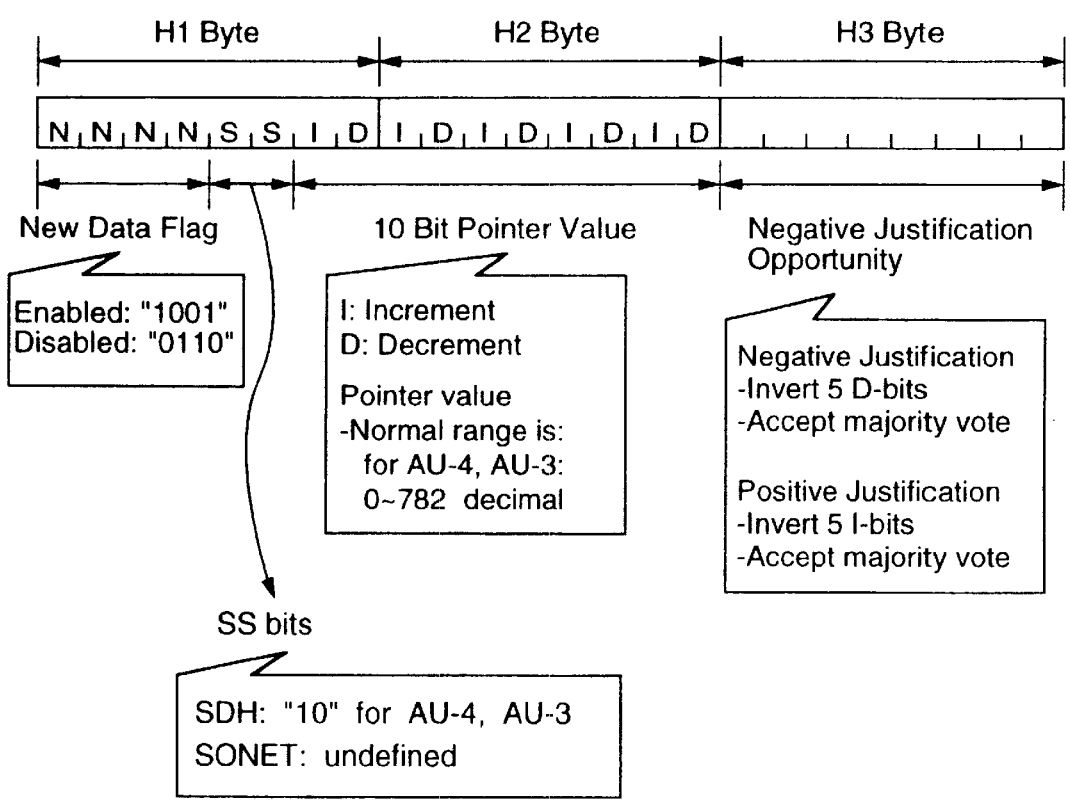
FIG. 2 is an explanatory view showing a difference of SS bits (five and six bits of a H1 byte) regulated according to the standardization between the SONET system and the SDH system.
Figure 3:
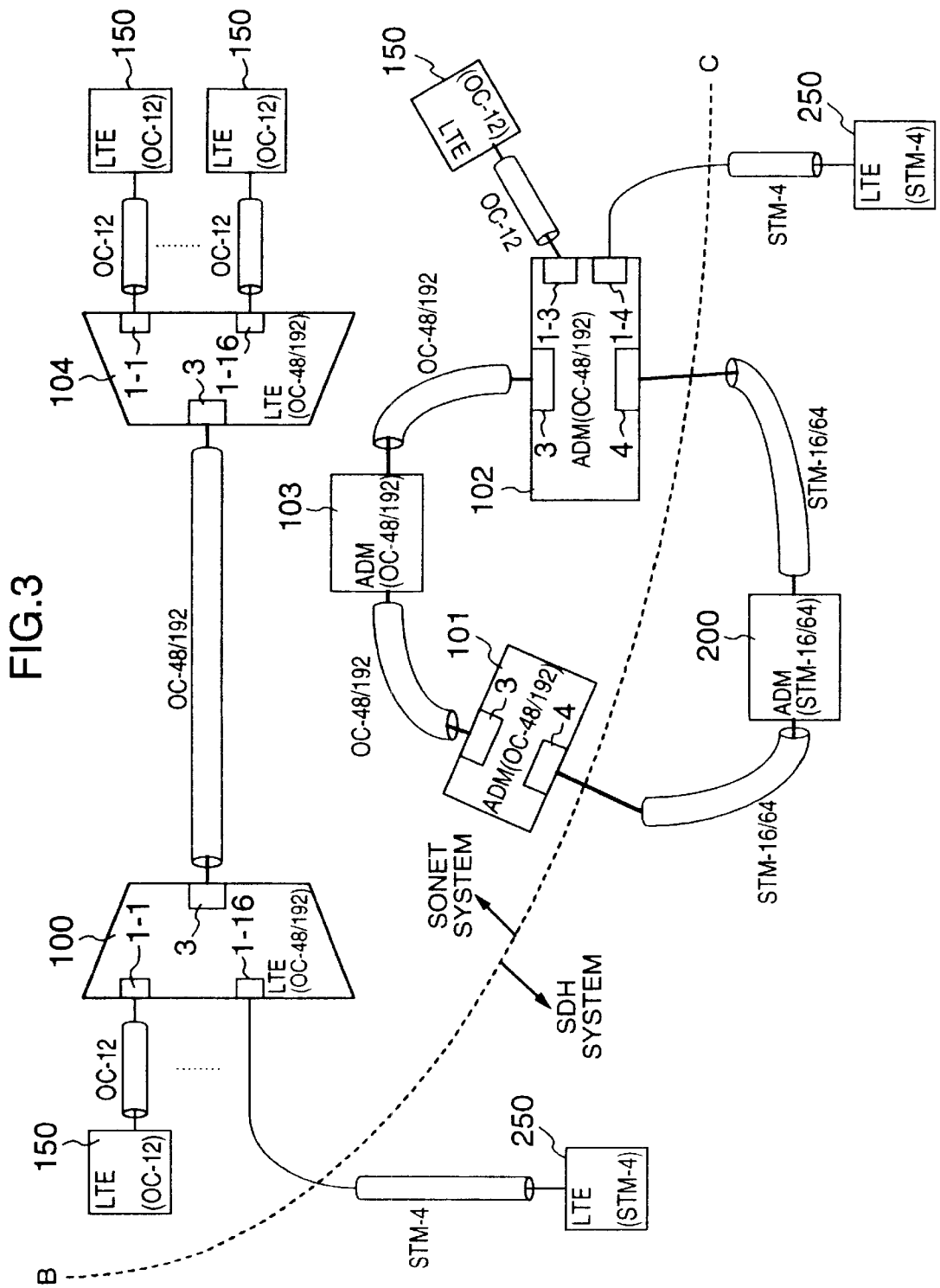
FIG. 3 is an explanatory view showing how a multiplex type transmitting apparatus is used close to a border of an international network.
Figure 4:
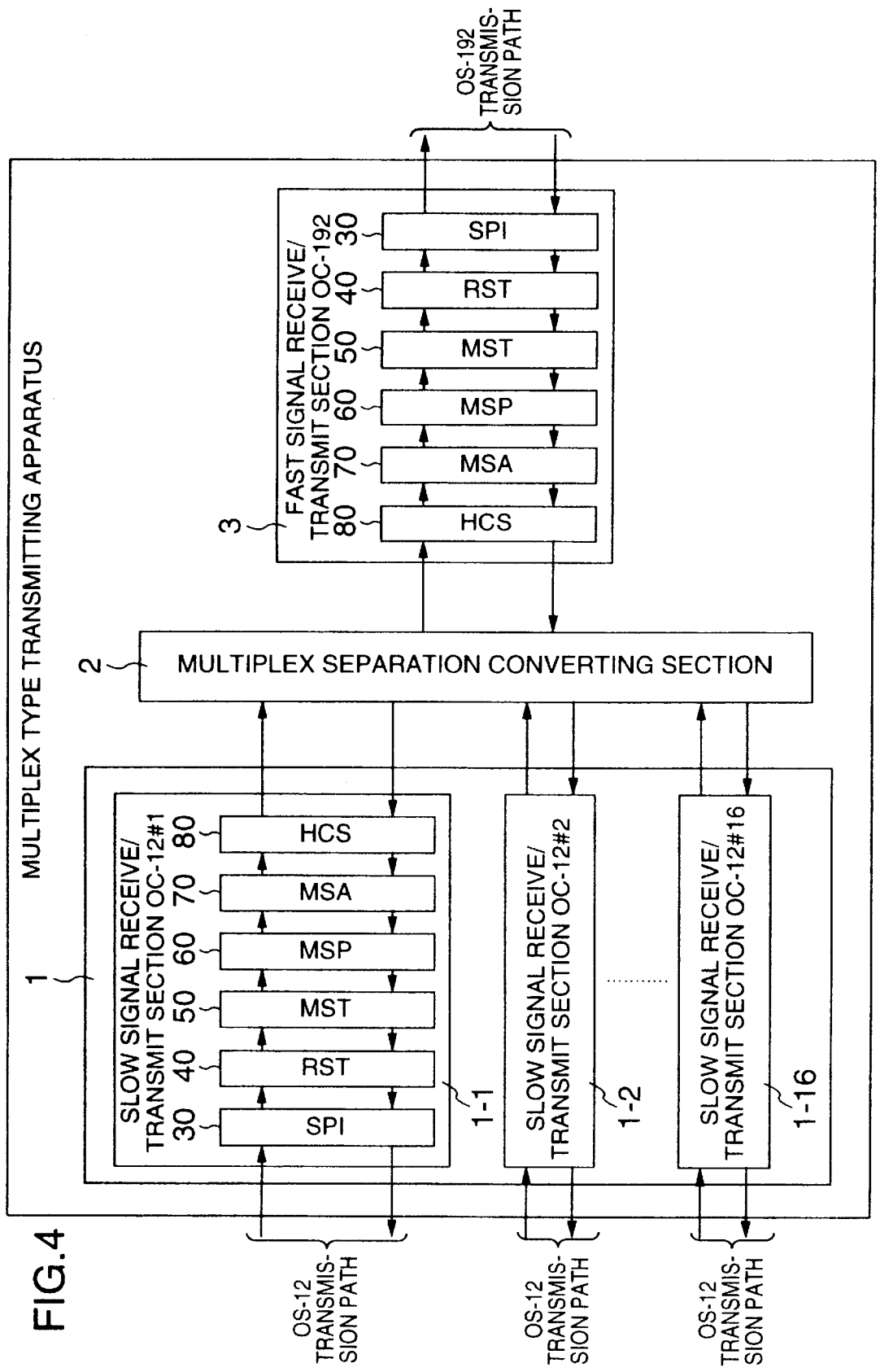
FIG. 4 is a function block diagram showing an LTE type multiplex type transmitting apparatus.
Figure 5:
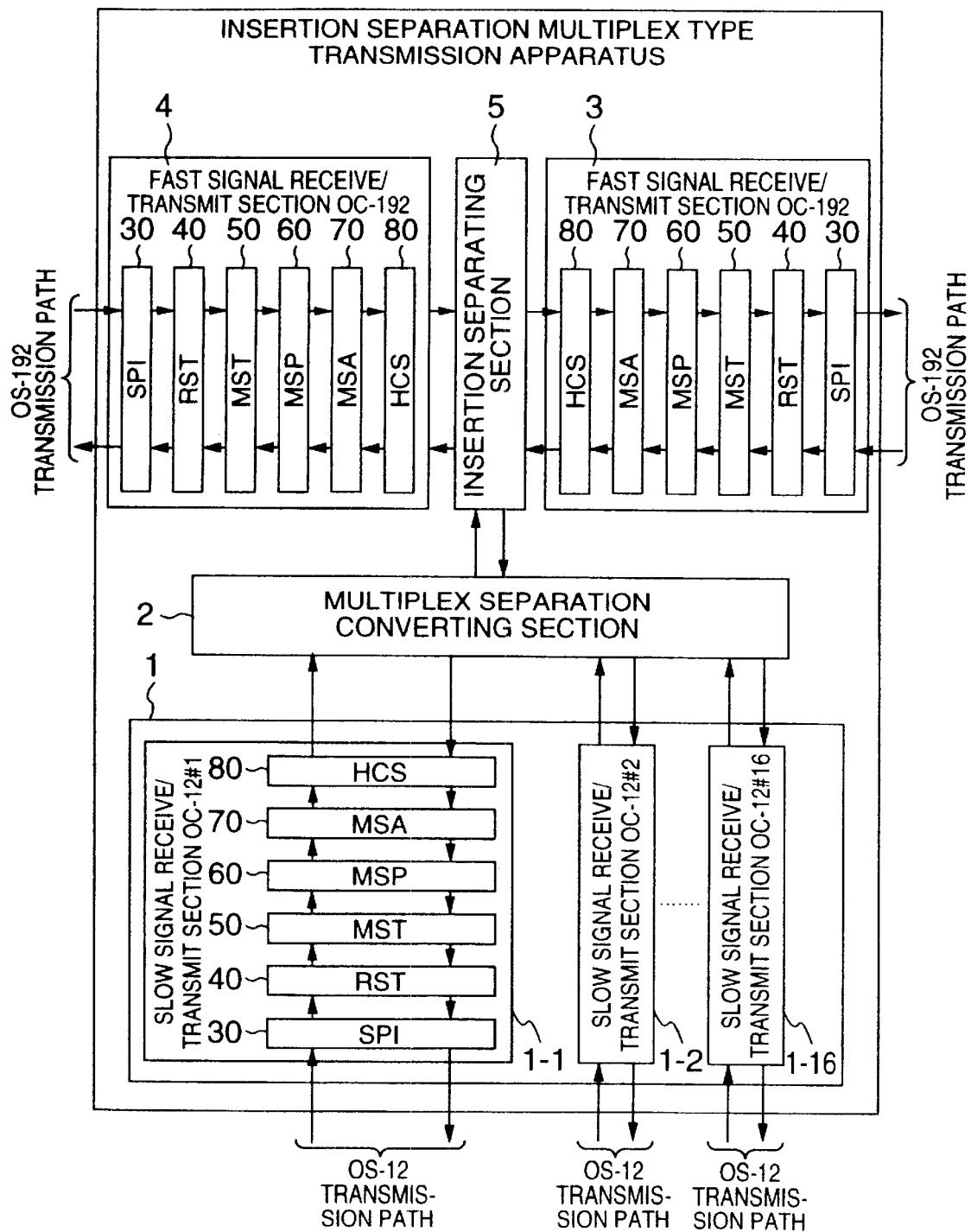
FIG. 5 is a function block diagram showing an ADM type multiplex type transmitting apparatus.
Figure 6:
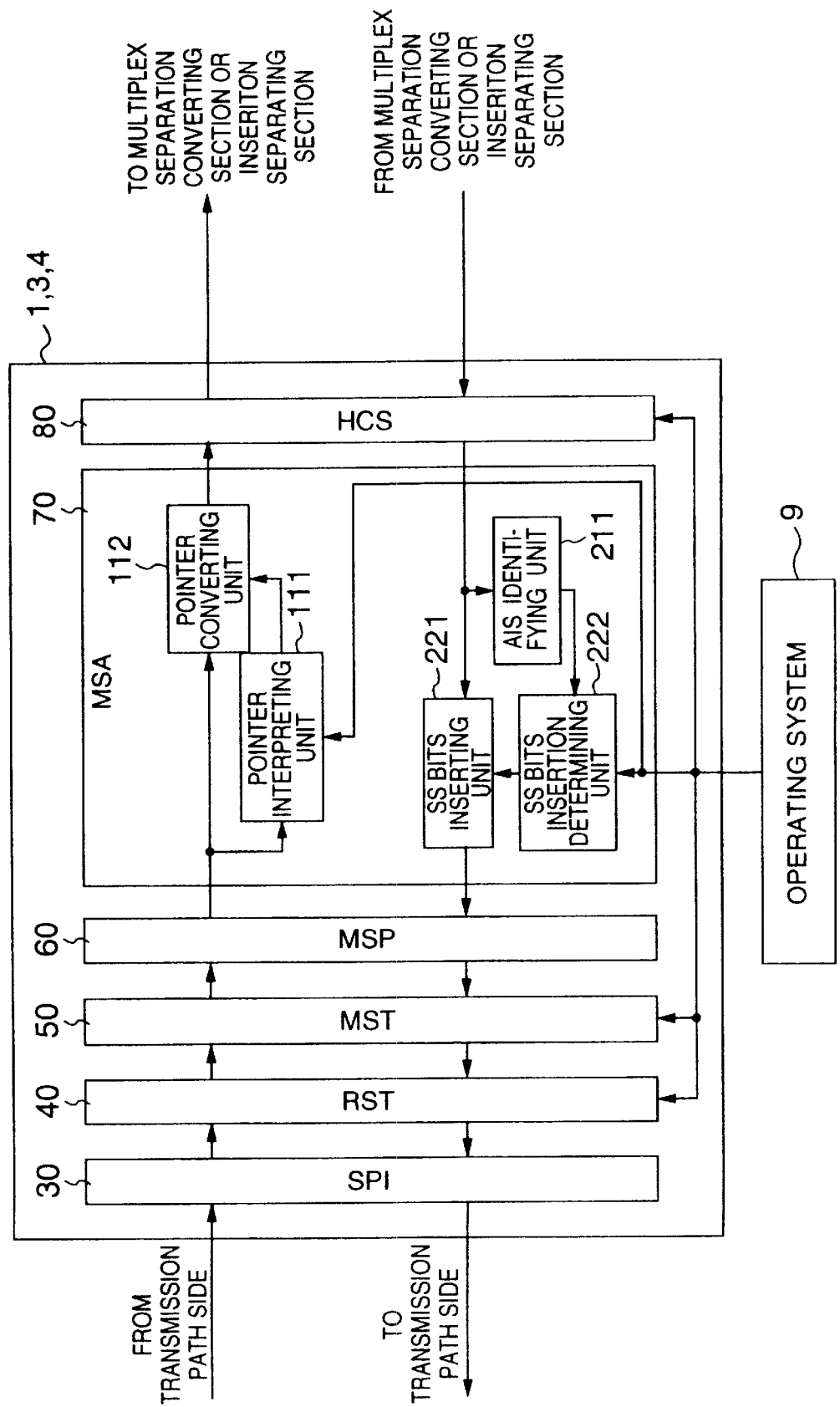
FIG. 6 is a block diagram showing a signal receive/transmit section of an existing multiplex type transmitting apparatus.
Figure 7:
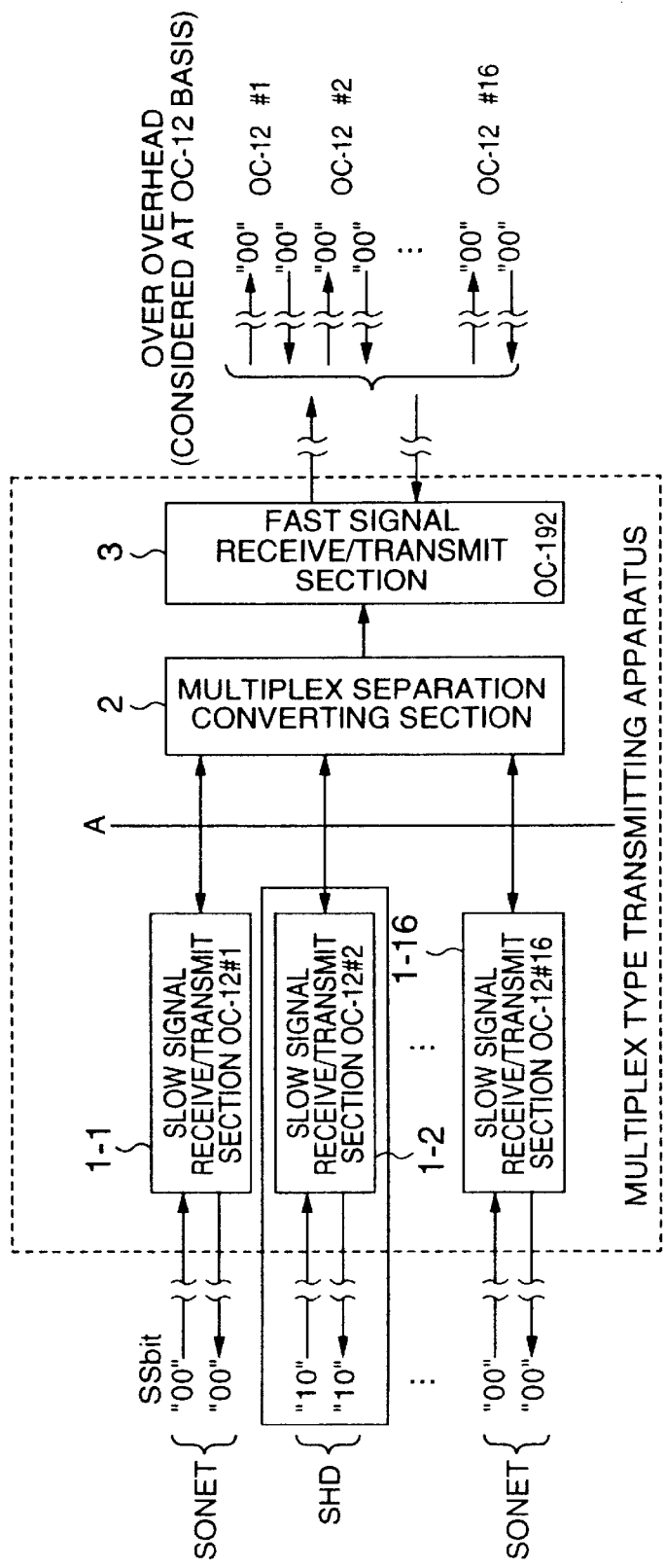
FIG. 7 is a concept view showing an arrangement of a transmission system used in the multiplex type transmitting apparatus according to the present invention.

At first, the description will be oriented to a multiplex type transmitting apparatus arranged to have a plurality of slow signal receive/transmit sections for receiving and transmitting a SONET type signal and an SDH system signal, a multiplex separation converting section, and a receive/transmit sections for a SONET system fast signal. In FIG. 7, an SDH system multiplexing apparatus is connected as a counterpart to a slow signal transmit/receive section (OC-12) 1-2. A SONET system multiplexing apparatus is connected as a counterpart to the other slow signal transmit/receive section (OC-12) 1.

In this case, it isy necessary to set the SS bits to "10" only on the transmit side (for transmit/receive) of the slow signal transmit/receive apparatus (OC-12) 1-2 provided with the SDH system multiplexing device served as a counterpart.

Hence, the promotion of the SS bits is required to be closed in the area (portion enclosed by a frame of FIG. 7) of the transmission path side viewed from each interface.

The SS bits in the multiplex type transmitting apparatus (A point) are given in the transmitting unit of the fast speed receive/transmit section (OC-192) and then is sent out onto the fast transmission path.

The multiplex type transmitting apparatus according to this embodiment is arranged to divide a transmitting process into a transmit processing section on the receive side and a transmit processing section on the transmit side. Hence, the proper SS bits can be transmitted even if the SONET system counterpart is opposed to the SDH system opposition device at a time.

The present embodiment has concerned with the multiplex type transmitting apparatus composed of a plurality of slow signal receive/transmit sections for receiving and transmitting a SONET system signal and an SDH system signal, a multiplex separation converting section, and a receive/transmit section for a SONET system fast signal. In place, the multiplex type transmitting apparatus may be arranged to have a plurality of slow signal receive/transmit sections for receiving and transmitting a SONET system signal and an SDH system signal, a multiplex separation converting section, and a receive/transmit section for an SDH system fast signal.

Likewise, in place, the multiplex type transmitting apparatus may be arranged to have a plurality of slow signal receive/transmit sections for receiving and transmitting a SONET system signal and an SDH system signal, a multiplex separation converting section, and a receive/transmit section for a SONET system and an SDH system fast signals.

Figure 8:
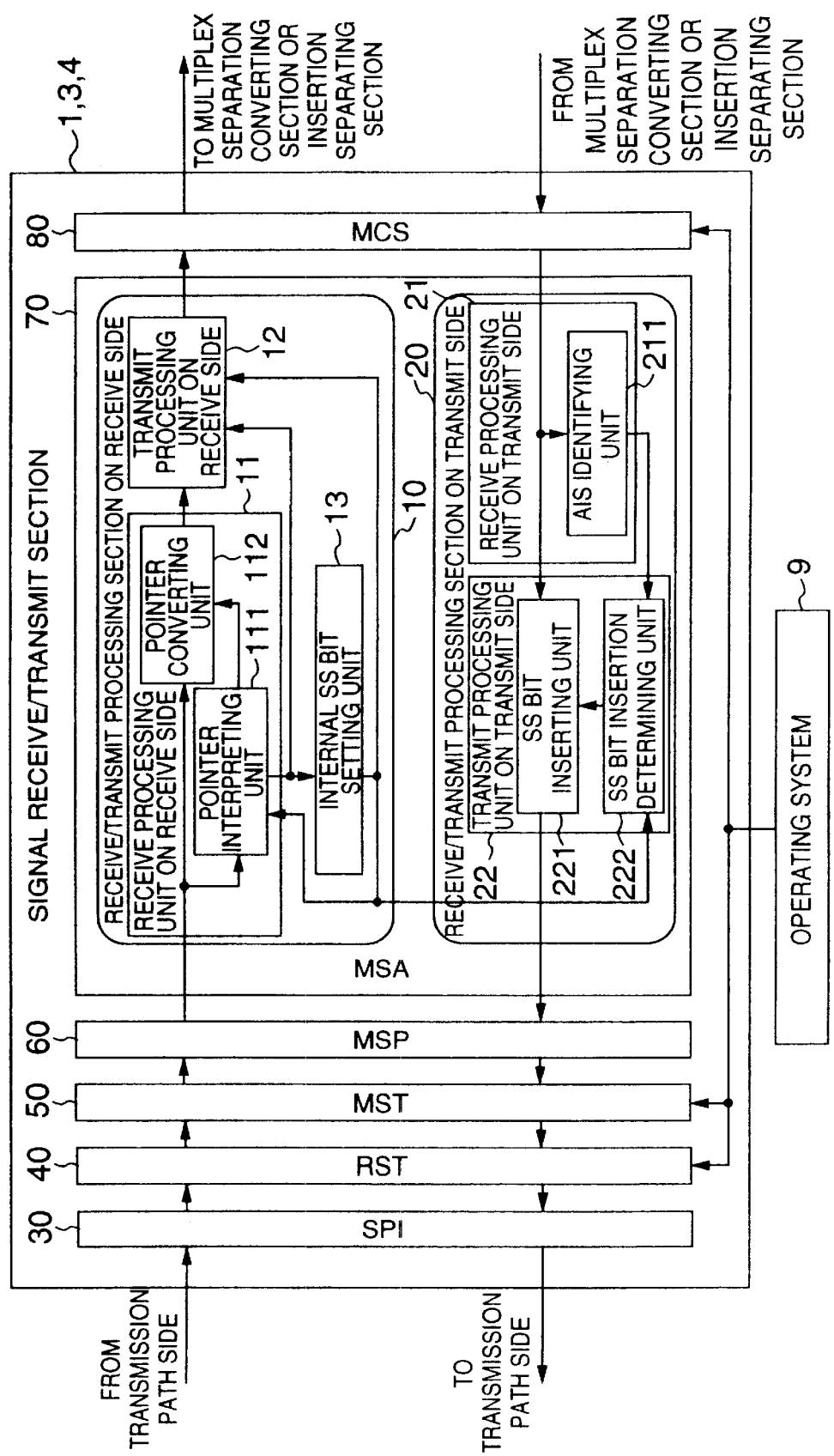
FIG. 8 is a block diagram showing a function of a slow signal receive/transmit section of a multiplex type transmitting apparatus according to the present invention.

FIG. 8 is a function block diagram showing a slow signal receive/transmit section 1 and a fast signal receive/transmit section 3 located on a transmission path side of the multiplex type transmitting apparatus according to the present invention.

The signal receive/transmit section provided on the transmission path side of the multiplexing apparatus according to the present invention is composed of a receive/transmit processing section on the receive side 10 and a receive/transmit processing section on the transmit side 20.

The receive/transmit processing section 10 on the receive side is composed of a receive processing unit on the receive side 11, a transmit processing unit on the receive side 12, and an internal SS bits setting unit 13.

The receive/transmit processing section on the transmit side 20 is composed of a receive processing unit on the transmit side 21 and a transmit processing unit on the transmit side 22. Further, the receive processing unit on the transmit side 21 includes a pointer simple termination 211 for identifying an AIS. The transmit processing unit on the transmit side 22 is composed of an SS bits inserting unit 221 and an SS bits insertion determining unit 222.

The multiplex type transmitting apparatus according to the present invention is arranged to receive the SONET system or SDH system signal in the receive/transmit processing section on the receive side 1.

The receive processing unit on the receive side 11 operates to detect any SS bits of "10" for indicating an SDH transmitting system from the SS bits of a pointer of the received overhead or "00" for indicating the SONET transmitting system.

The value of the detected SS bits is conveyed to the internal SS bits setting unit 13 in which it is set as internal SS bits. Herein, the "internal SS bits" are "10" or "00". If any other value rather than them is received, the previous SS bits are held as internal SS bits.

The internal SS bits are set at a specific transmission capacity unit, for example, at an STM-64 (OC-192) unit in the fast receive/transmit section connected to the transmission path of the STM-64 (OC-192) or at an STM-4 (OC-12) unit in the slow receive/transmit section connected to the transmission path of the STM-4 (OC-12). Since plural AUs are contained in a specific transmission capacity unit, the receive SS bits corresponding to these AUs are contained in the capacity unit as well. The setting of the internal SS bits may be the setting of the receive SS bits at the head AU of a specific transmission capacity unit or the decision-by-majority determination of all the receive SS bits for all AUs contained in the specific transmission capacity unit. In the concatenated path, the SS bits inside of a CI (Concatenation Indicator) are not still defined in the SONET system and the SDH system. In the decision-by-majority determination, it is desirous to exclude the SS bits inside of the CI. If only one AU is contained in a specific transmission capacity unit, concretely, if the specific transmission capacity unit is OC-1 (just one AU-3 is provided), if the specific transmission capacity unit is STM-1 and the AU size contained in the unit is AU-4, or if the specific transmission capacity unit is STM-N (N>4) and the AU size contained in the unit is AU-4-Nc, the receive SS bits at the head AU inside of the STM frame are set as internal SS bits.

The transmit processing section on the receive side 12 takes a step (1) of setting the SS bits to "11" if an alarm indication signal AIS is transferred and another step (2) of unprocessing the SS bits or setting the SS bits to the internal SS bits or any value if no AIS is transferred and then transmitting the signal to the multiplex separation converting section provided in the multiplex type transmitting apparatus. Herein, the AIS is AIS-P (AU-AIS at the AU level) at the STS path level. In turn, the description will be oriented to how the SS bits are treated in the transmit processing section on the receive side 12. The output of the transmit processing section on the receive side 12 shown in FIG. 8 corresponds to a signal at a location A between the slow signal receive/transmit section 1 and the fast signal receive/transmit section 3 located in the apparatus shown in FIG. 7. At this location A, the process of the SS bits is out of operation. If the present invention is applied to both the slow signal receive/transmit section 1 and the fast signal receive/transmit section 3, the proper internal SS bits to the counterpart are given in the transmit processing unit on the transmit side 22 (see FIG. 8) included in the fast signal receive/transmit section 3 (or the slow signal receive/transmit section 1) at a later stage than the multiplex separation converting section 2. Hence, the SS bits at this location A may be a provisional value defined inside of the multiplex type transmitting apparatus. The concrete content of the SS bits may be selected as the unprocessed SS bits, the "internal SS bits" set on the value from the internal SS bits setting unit 13, or any constant value "00", "01", "10" or "11". In some cases, the content of the SS bits may depend on the apparatus arrangement.

For example, in a case of taking an arrangement shown in FIG. 7 where the present invention is applied to the slow signal receive/transmit section 1 only and the SS bits are simply passed through the fast speed receive/transmit section 3 to the transmission path, which is out of the present invention, it is essential to set the SS bits to "10" if the fast signal receive/transmit section 3 is operating at the SDH mode, while if the fast signal receive/transmit section 3 is operating at the SONET mode, it is desirous to set the SS bits to "00". However, the SS bits except these values may be selected without any problem.

The transmit processing section on the receive side 12 shown in FIG. 8 indicates the case that the SS bits are not processed when no AIS is transferred.

The receive processing section on the transmit side 21 includes a pointer simple termination 211 for identifying a size of a path received from the multiplex separation converting section 2 and the receipt of the alarm indication signal AIS. Like the foregoing transmit processing section on the receive side 12, the AIS is AIS-P (AU-AIS at AU level) at an STS path level.

The SS bits insertion determining unit 222 located in the transmit processing section on the transmit side 22 operates to receive the value of the "internal SS bits" from the internal SS bits setting unit 13 and obtain the information on the path size received from the pointer simple termination 211 and then allocate the value of the internal SS bits to the SS bit positions of the H1 byte. The SS bits are inserted at a specific transmission capacitance unit, concretely, at an STM-64 (OC-192) unit in the fast receive/transmit section connected to the transmission path of the STM-64 (OC-192) or at an STM-4 (OC-12) unit in the slow receive/transmit section connected to the transmission path of the STM-4 (OC-12). That is, the SS bits of all AUs contained in a specific transmission capacitance unit are transmitted onto the transmission path side as keeping the SS bits as the same values.

At this time, the SS bits insertion determining unit 222 takes a step of (1) unprocessing the SS bits or inserting "11" as the SS bits in the case of transferring an AIS and another step of (2) setting the SS bits to the "internal SS bits" based on the value from the internal SS bits setting section 13 in the case of transferring no AIS. The SS bits inserting unit 221 operates to insert the values of the internal SS bits into the SS bits of the pointer based on the determination given by the SS bits insertion determining unit 222 and then transmit the resulting SS bits onto the transmission path. Herein, like the foregoing receive processing section on the transmit side 21, the AIS is AIS-P (AU-AIS at an AU level) at an STS path level.

In the case of transferring an AIS, as mentioned above, the SS bits are not processed. This is because at the transfer of the AIS, the SS bits input to the receive processing unit on the transmit side 21 have to take a value of "11". In the device located in the downstream, the AIS is detected by determining if the H1 byte and the H2 byte take "1's" at all the bit positions. Hence, if the AIS is transferred, the value of the internal SS bits is prohibited to be inserted to the SS bits. In any case, it is necessary to unprocess the SS bits or insert "11" to the SS bits.

The processing contents of the receive processing unit on the receive side 11, the transmit processing unit on the receive side 12, and the transmit processing unit on the transmit side 22 provided in the multiplex type transmitting apparatus are collectively illustrated in FIG. 9.

The foregoing description will be oriented to the internal SS bits setting unit 13 arranged to set the internal SS bits each time the receive processing unit on the receive side 11 receives a signal. When a new counterpart is connected to the transmission path, the internal SS bits setting unit 13 may operate to execute an initialization of setting and storing the internal SS bits, read the stored internal SS bits from the storage and then put them on the SS bits of the pointer to be sent onto the transmission path.

Figure 10:
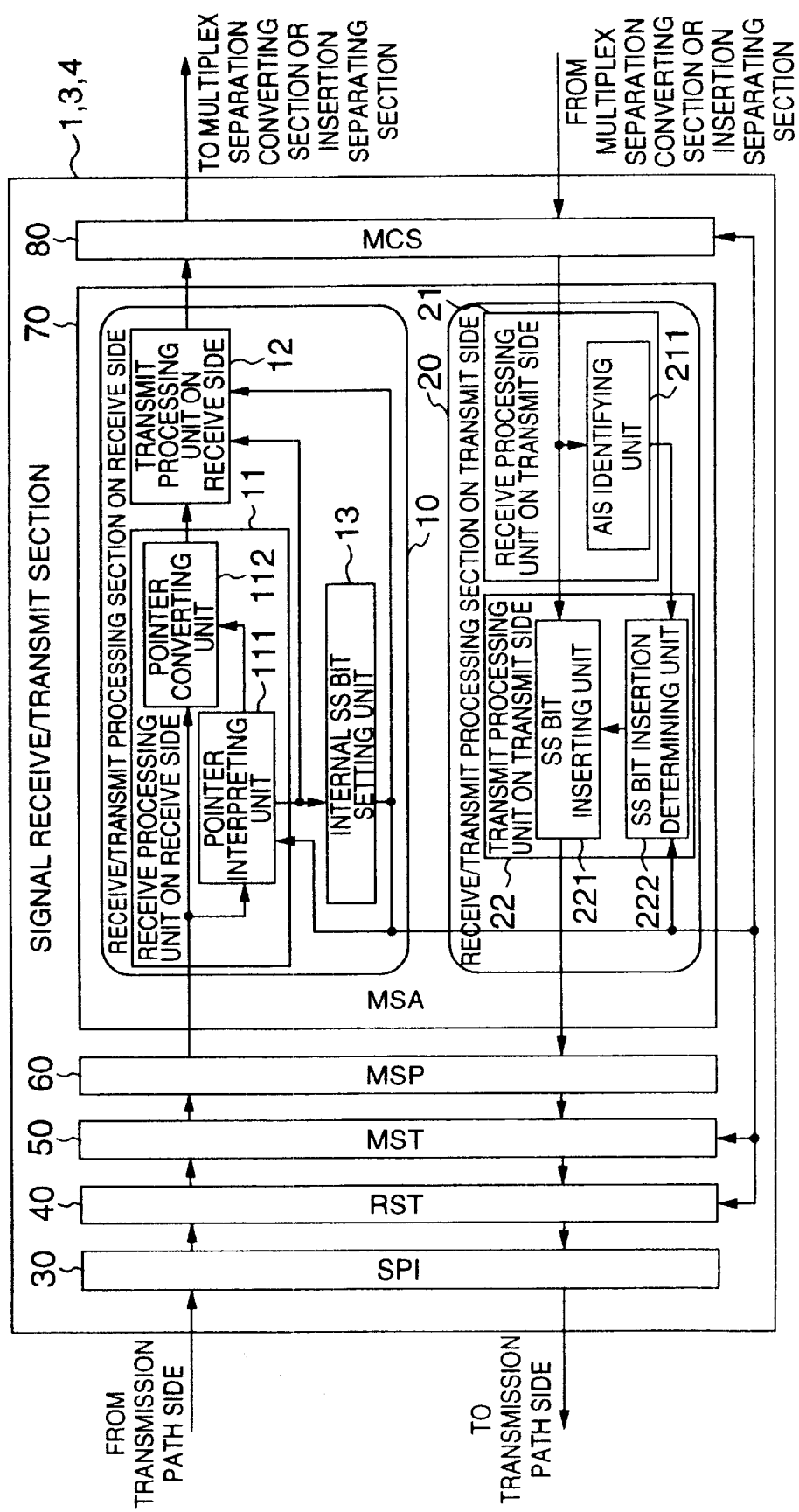
FIG. 10 is a function block diagram showing a slow signal receive/transmit section 1 or a fast signal receive/transmit section 3 located on the transmission path of the multiplex type transmitting apparatus according to the embodiment of the present invention.

FIG. 10 is a function block diagram showing the slow signal receive/transmit section 1 or the fast signal receive/transmit section 3 located on the transmission path side of the multiplex type transmitting apparatus according to another embodiment of the present invention. As shown in FIG. 10, an SPI section 30, a RST section 40, an MST section 50, an MSP section 60, an MSA section 70, and a HCS section 80 have the corresponding functions of the SDH system regulated in the ITU-TG.783 and the corresponding functions of the SONET system. The receive/transmit processing section on the receive side 10 and the receive/transmit processing section on the transmit side 20 included in the MSA section 70 have the same arrangements as shown in FIG. 8. The present embodiment is characterized in that the value of the SS bits to be transmitted is automatically selected from the internal SS bits and the automatic selection of the SDH system or the SONET system is executed on the value of the internal SS bits, for the terminating and monitoring operations of the main signal executed in the RST section 40 having a generation terminating function of the J0 (C1) byte, the MST section 50 having a generation terminating function of the S1 byte, the MSA section 70, and the HCS section 80. That is, if the internal value SS bits take a value of "00", all or part of the RST section 40, the MST section 50, the MSA section 70, and the HCS section 80 is operated in the SONET system. If, on the other hand, the internal SS bits take a value of "10", it is operated in the SDH system. The selecting unit of the SONET/SDH system is the specific transmission capacity unit, concretely, the STM-64 (OC-1992) unit in the fast receive/transmit section connected to the STM-64 (OC-192) and the STM-4 (OC-12) in the slow receive/transmit section connected to the STM-4 (OC-12).

As shown in FIG. 7, when the SONET transmitting system signal or the SDH transmitting system signal is transmitted to an interface of the transmitting apparatus, this multiplex type transmitting apparatus according to the present invention operates to identify the SONET system signal or the SDH system signal without any indication given from an operation system or a local craft system and transmit the proper SS bits to the opposition device.

The multiplex type transmitting apparatus according to the present invention is arranged to divide the transmitting process executed in the slow signal receive/transmit section into the transmit processing unit on the receive side 12 and the transmit processing unit on the transmit side 21 and have the internal SS bits setting unit for setting the "internal SS bits" based on the "internal SS bits" detected by the receive/transmit processing unit on the receive side 10. Hence, when an AIS is received and the SS bits take a value except "10" or "00", the internal SS bits setting unit enables to prevent the erroneous SS bits from being transmitted by holding the previous SS bits state.

The multiplex type transmitting apparatus according to the present invention operates to automatically select the value of the transmission SS bits based on the internal SS bits and automatically select the system, the SDH system or the SONET system of the terminating and monitoring operation of the main signal executed in the RST unit 40 having a generation terminating function of the JO (C1) byte, the MST unit 50 having a generation terminating function of the S1 byte, the MSA unit 70, and the HCS unit 80, based on the internal SS bits.

What is claimed is:

1. A multiplex type signal transmission apparatus, comprising:

a plurality of slow signal receiving/transmitting sections for receiving and transmitting a slow signal;

a multiplex separation converting section; and a fast signal receiving/transmitting section at a receiving side for receiving and transmitting a fast signal, wherein each of said plurality of slow signal receiving/transmitting sections includes:

a receiving processing section for receiving said slow signal from a transmission path, an internal SS bit setting unit selected from one of:

a first internal SS bit with respect to each SS bit set A of a plurality of H1 bytes existing in a same frame of the received slow signal, for setting, in case that the SS bit B received at first time are value of A10"or A00", the internal SS bits to said value, and otherwise the internal SS bits hold a previous state, a second internal SS bit setting unit, with respect to each SS bit set C having value of A10"or A00"among said SS bit set A, for comparing the number of M of the SS bits having value of A10"with the number L of the SS bits having value of A00", and for setting, in case that said M is larger than said L, the internal SS bits to A10", in case that said M is smaller than said L, the internal SS bits to A00", and in case that M is equal to said L or there is no elements of the SS bits set C, the internal SS bits hold a previous state, and a third internal SS bit setting unit, with respect to each SS bit set D not included in concatenation indicator and having value of A10"or A00"among said SS bit set A, for comparing the number of N of the SS bits having value of A10"with the number K of the SS bits having value of A00", and for setting, in case that said N is larger than said K, the internal SS bits to A10", in case that said N is smaller than said K, the internal SS bits to A00", and in case that said Ni is equal to said K or there is no elements of the SS bits set D, the internal SS bits hold a previous state, and a transmission processing unit on a transmitting side for transmitting the slow signal onto said transmission path as keeping the plurality of SS bits of the signal from said multiplex separation converting section identical with the internal SS bits set by said internal SS bits setting section, wherein said fast signal receiving/transmitting section includes:

a receive processing section for receiving said fast signal from a transmission path, an internal SS bits setting unit selected from one of:

a fourth internal SS bit set E of a plurality of H1 bytes existing in a same frame of the received fast signal, for setting in case that the SS bits set F received at first time are value of A10"or A00", the internal SS bits to said value, and otherwise the internal SS bits hold a previous state, a fifth internal SS bits setting unit, with respect to each SS bit set G having value of A10"or A00"among said SS bit set E, for comparing the number of P of the SS bits having value of A10"with the number Q of the SS bits having value of A00", and for setting, in case that said P is larger than said Q, the internal SS bits to A10", in case that said P is smaller than said Q, the internal SS bits to A00", and in case that said P is equal to said Q or there is no elements of the SS bits set G, the internal SS bits hold a previous state, and a sixth internal SS bits setting unit, with respect to each SS bits set H not included in concatenation indicator and having value of A10"or A00"among said SS bit set E, for comparing the number of R of the SS bits having value of A10"with the number S of the SS bits having value of A00", and for setting, in case that said R is larger than said S, the internal SS bits to A10", in case that said R is smaller than said S, the internal SS bits to A00", and in case that said R is equal to said S or there is no elements of the SS bits set H, the internal SS bits hold a previous state, and a transmission processing unit on a transmitting side for transmitting the fast signal onto said transmission path as keeping the plurality of SS bits of the signal from said multiplex separation converting section identical with the internal SS bits set by said internal SS bits setting section.

2. A multiplex type signal transmission apparatus according to claim 1, wherein said transmission processing unit on the transmitting side of each of said plurality of slow signal receiving/transmitting sections transmits the slow signal onto said transmission path as keeping the SS bits of the signal or setting the SS bits to A11"in case that the signal from said multiplex separation converting section includes an alarm indication signal, otherwise setting the SS bits to be identical with the internal SS bits set by said internal SS bits setting section, and said transmission processing unit on the transmitting side of each of said plurality of fast signal receiving/transmitting sections transmits the fast signal onto said transmission path as keeping the SS bits of the signal or setting the SS bits to "11" in case that the signal from said multiplex separation converting section includes an alarm indication signal, otherwise setting the SS bits to be identical with the internal SS bits set by said internal SS bits setting section.

* * * * *